United States Patent [19]

Yamada et al.

[11] Patent Number: 4,471,254

[45] Date of Patent: Sep. 11, 1984

[54] BRUSH HOLDER FOR ROTARY ELECTRIC APPARATUS

[75] Inventors: Makoto Yamada; Yuji Nakanishi, both of Kobe, Japan

[73] Assignee: Mitsubishi Denki Kabushiki Kaisha, Japan

[21] Appl. No.: 464,942

[22] Filed: Feb. 8, 1983

[30] Foreign Application Priority Data

Feb. 10, 1982 [JP] Japan ............................ 57-18658[U]

[51] Int. Cl.[3] ............................................ H02K 13/00

[52] U.S. Cl. .................................... 310/242; 310/245

[58] Field of Search ............... 310/239, 242, 245, 246, 310/247, 240, 244, 241; 29/597

[56] References Cited

U.S. PATENT DOCUMENTS

| | | | |
|---|---|---|---|
| 3,523,288 | 8/1970 | Thompson | 310/245 |
| 3,968,391 | 7/1976 | Blank | 310/245 |
| 4,272,695 | 7/1981 | Buchwald | 310/245 |
| 4,344,009 | 8/1982 | Reynolds | 310/245 |
| 4,348,608 | 9/1982 | Michael | 310/245 |

FOREIGN PATENT DOCUMENTS 56145362 of 0000 Japan .

*Primary Examiner*—R. Skudy
*Attorney, Agent, or Firm*—Leydig, Voit, Osann, Mayer & Holt

[57] ABSTRACT

This invention relates to a brush holder for a rotary electric apparatus comprising: a holder body having a brush frame for slidably holding a brush, a brush retainer pivotally secured to a holder arm attached to the holder body through a pin, a spring provided between the holder body and the brush retainer, a stopper mounted on the holder body for stopping the movement of the brush retainer at a predetermined position, and a contacting piece mounted on the stopper being electrically insulated from said holder body and positioned so that it comes into electromechanical contact with the brush retainer when the brush reaches the wearing limit.

3 Claims, 3 Drawing Figures

(A)

(B)

BRUSH HOLDER FOR ROTARY ELECTRIC APPARATUS

BACKGROUND OF THE INVENTION

This invention relates to a brush holder used for rotary electric machines such as generators or motors.

FIGS. 1(A) and 1(B) show a conventional brush holder, wherein FIG. 1(A) illustrates a brush which is not yet worn, and FIG. 1(B) illustrates a brush which is worn to a wearing limit. In FIGS. 1(A) and 1(B), numeral 1 designates a brush, numeral 2 a holder body which holes the brush 1 and which is composed of a brush frame 3 and a holder arm 4. Numeral 5 indicates a buruh retainer which is pivotally secured via a pin 5*a* to the holder arm 4 for retaining the brush 1 and which is composed of a lever 6 and a presser 7. Numeral 8 shows a spring utilized for applying pressure on brushes 1 by the brush retainer 5. The spring 8 is engaged at one end with a pin 10 which is provided on the lever 6 of the brush retainer 5 through a supporting bracket 9 and is engaged at the other end with a pin 11 which is provided on the holder arm 4 of the holder body 2. Numeral 12 denotes a stopper which is provided on the holder body 2 and which prevents the movement of the brush retainer 5 from going beyond a predetermined position. The stopper 12 is constructed to stop the movement of the brush retainer 5 when the brush 1 reaches its wearing limit.

However, in the conventional brush holder thus constructed as described above, the wear of the brush 1 is visually examined, and has the disadvantage that periodic checking is required to check the state of the brushes.

SUMMARY OF THE INVENTION

This invention has been made in order to eliminate the disadvantages mentioned above, and has for its object to provide a brush holder which is provided with a contacting piece which comes into electromechanical contact with a brush retainer when the brushes in the brush holder wear beyond a predetermined wearing limit which intern cause electrical indicating means to be activated, thereby eliminating the neccessity of periodically checking the state of the brushes.

BRIEF DESCRIPTION OF THE DRAWINGS

In the drawings, like reference numerals and symbols designate like parts.

DESCRIPTION OF THE PREFERRED EMBODIMENT

Now, an embodiment of this invention will be described with reference to FIG. 2.

Figure 1:
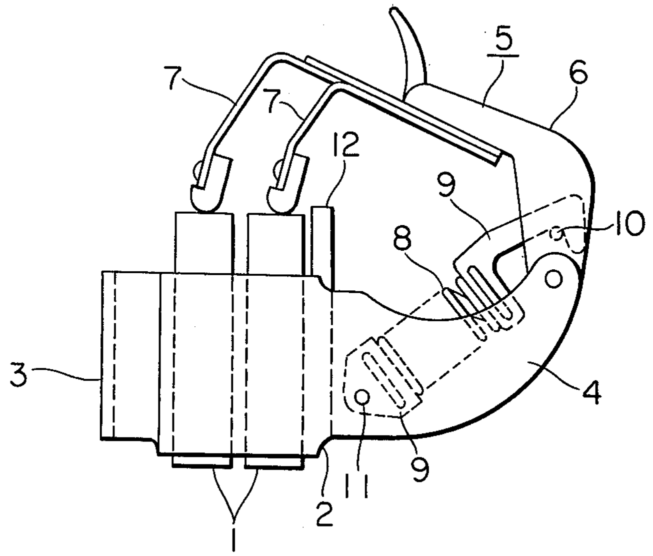
FIG. 1 PRIOR ART
FIG. 1(A) is a side view of a conventional brush holder in which a brush is not worn.
FIG. 1(B) is a side view of the conventional brush holder in which the brush is worn to its wearing limit.
Figure 1:
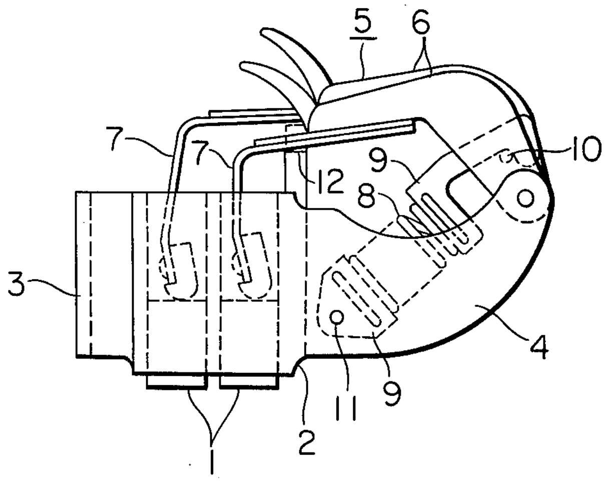
FIG. 1 PRIOR ART
Figure 2:
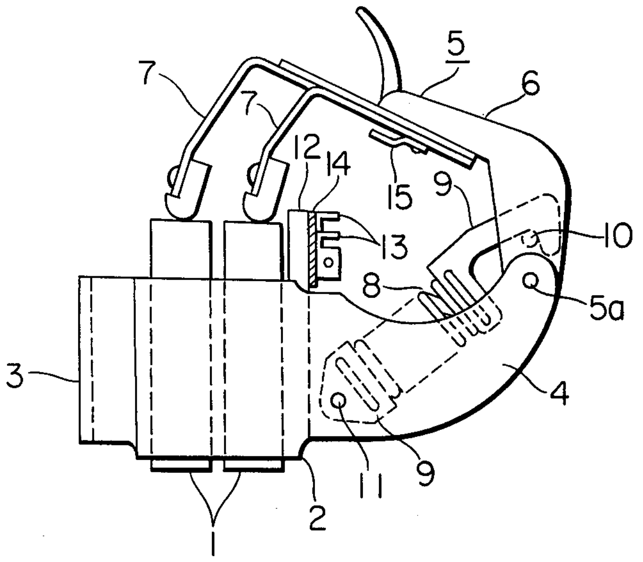
FIG. 2 is a side view of an embodiment of a brush holder acdording to this invention.

In FIG. 2, numerals 1 to 12 indicate the same constituents as in the conventional brush holder described above. Numeral 13 designates a contacting piece which is attached to the stopper 12 via an insulator 14 and which is electrically insulated from the holder body 2. The contacting piece 13 is provided to confront a contacting piece 15 which is attached to the brush retainer 5. When the brush 1 reaches its wearing limit, the contacting piece 15 comes into contact with the contacting piece 13. Thus, an external brush wear detecting mechanism (not shown) which is electrically connected to both contacting pieces 13 and 15 will operate and detect the wear of the brush 1. In other words, the contacting piece 15 of the brush retainer 5 and the contacting piece 13 form an electrical contact when the brushes wear beyond a predefined point which causes the external brush wear detecting mechanism to be activated.

The arrangement of this brush holder operates as follows:

When the brush 1 wears, the brush retainer 5 will move towards the stopper 12. When the brush 1 is worn to its wearing limit, the brush retainer 5 is prevented by the stopper 12 from moving any further, and the contacting piece 15 of the brush retainer 5 comes into contact with the contacting piece 13 and hence is in an electrically conductive state. More particularly, the contacting piece 15 and the contacting piece 13 constitute an electric contact for the brush wear detecting mechanism. Accordingly, the brush wear detecting mechanism electrically detects the contacting state of the contacting piece or portion 15 of the brush retainer 5 with the contacting piece 13, and hence detects the contacting state as an electric signal. For example, an alarm unit (not shown) such as a buzzer, a lamp, etc. is operated by the electric signal, thereby electrically simply detecting the wearing limit of the brush 1. Thus, maintenance can be omitted, and resource-saving of the brush 1 can be simultaneously achieved. In other words, the worn brush 1 has been heretofore been replaced with a new brush even if the worn brush had a slightly allowable length. However, according to this invention, the brush can be used up to its full wearing limit.

While, in this embodiment, the contacting piece 13 is provided on the stopper 12 through the insulator 14, the contacting piece 13 may be provided on the stopper 12 when the stopper is formed of an insulating material.

In the above embodiment, the contacting piece 15 of the brush retainer 5 comes into contact with the contacting piece 13. However, the contacting piece 13 may come into contact with the brush retainer 5 directly.

As described above, according to this invention, the contacting piece 13 is provided on the stopper 12 to confront the brush retainers and is electrically insulated from the holder body 2. Therefore, the wearing limit of the brush can be detected by electrically detecting the contacting state of the brush retainer with the contacting piece, which eliminates any maintenance check for the brushes.

What is claimed is:

1. A brush holder for rotary electric apparatus comprising:

- a holder body having a brush frame for slidably holding a brush,
- a brush retainer pivotally secured to a holder arm attached to said holder body through a pin,
- a spring provided between said holder body and said brush retainer,
- a stopper mounted on said holder body for stopping the movement of said brush retainer at a predetermined position, and
- a contacting piece mounted on said stopper, being electrically insulated from said holder body and said stopper, and positioned so that a contacting portion of said brush retainer comes into electromechanical contact with said contacting piece mounted on said stopper when said brush reaches the wearing limit.

2. A brush holder for a rotary electric apparatus as defined in claim 1, wherein said contacting piece is mounted on said stopper through an insulator.

3. A brush holder for a rotary electric apparatus as defined in claim 1, wherein said stopper is composed of an insulating material.

* * * * *